United States Patent [19]

Heidmann et al.

[11] Patent Number: 4,522,287
[45] Date of Patent: Jun. 11, 1985

[54] DISC BRAKE WITH CAMMING MEMBER AND TORSION SPRING FOR VIBRATION CONTROL

[75] Inventors: Kurt R. Heidmann; Jon S. Canale; Hans Burkhardt, all of Elyria, Ohio

[73] Assignee: The Bendix Corporation, Southfield, Mich.

[21] Appl. No.: 375,925

[22] Filed: May 7, 1982

[51] Int. Cl.³ .............................................. F16D 65/02
[52] U.S. Cl. .............................. 188/73.35; 188/73.45; 188/205 A
[58] Field of Search ................. 188/73.1, 73.31, 73.32, 188/73.35, 73.36, 73.37, 73.38, 73.39, 73.43, 73.44, 73.45, 205 R, 205 A, 206 R, 250 F; 74/567; 267/155, 156

[56] References Cited

U.S. PATENT DOCUMENTS

| | | | |
|---|---|---|---|
| 4,027,749 | 6/1977 | Yamamoto et al. | 188/73.31 |
| 4,310,076 | 1/1982 | Ikeda | 188/73.35 |
| 4,418,798 | 12/1983 | Johannesen et al. | 188/73.45 |
| 4,436,187 | 3/1984 | Bolenbaugh et al. | 188/73.45 |

FOREIGN PATENT DOCUMENTS

| | | | |
|---|---|---|---|
| 1920020 | 10/1970 | Fed. Rep. of Germany | 188/73.1 |
| 2252209 | 5/1974 | Fed. Rep. of Germany | 188/73.43 |
| 2708317 | 9/1977 | Fed. Rep. of Germany | 188/73.44 |
| 2205145 | 5/1974 | France | |
| 2284800 | 4/1976 | France | 188/73.43 |
| 2436286 | 4/1980 | France | |
| 55-36687 | 3/1980 | Japan | 188/73.43 |
| 1532572 | 11/1978 | United Kingdom | |
| 1585755 | 3/1981 | United Kingdom | |

Primary Examiner—Douglas C. Butler
Assistant Examiner—R. R. Diefendorf
Attorney, Agent, or Firm—Ken C. Decker; W. N. Antonis

[57] ABSTRACT

A disc brake assembly (10) includes a rotor (12) having a pair of friction faces (14, 16) and a pair of friction elements (18, 20) disposed adjacent the friction faces. A caliper (32) is slidably mounted on a support member (22) by mounting mechanism (40). Mounting mechanism (40) includes a camming member (66) supported by the support member (22) and slidably engaged by the caliper (32) and a torsion spring (82) which yieldably rotates the camming member (66) into camming engagement with the caliper (32) and support member (22).

10 Claims, 7 Drawing Figures

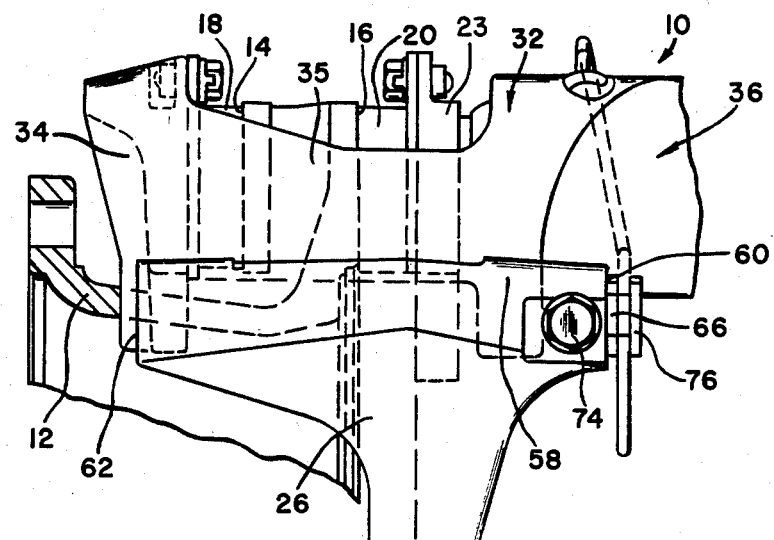
FIG. 2
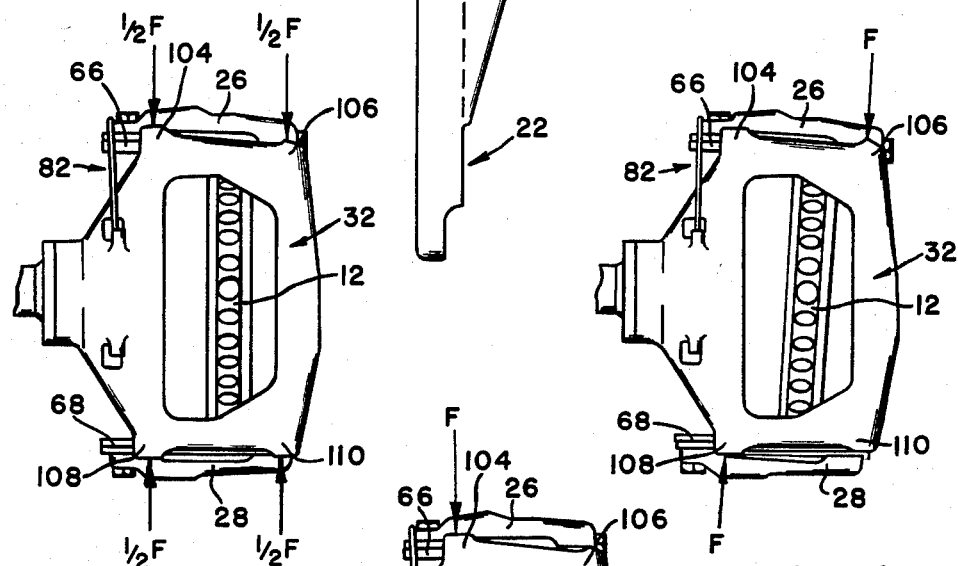
FIG. 4a
FIG. 4b
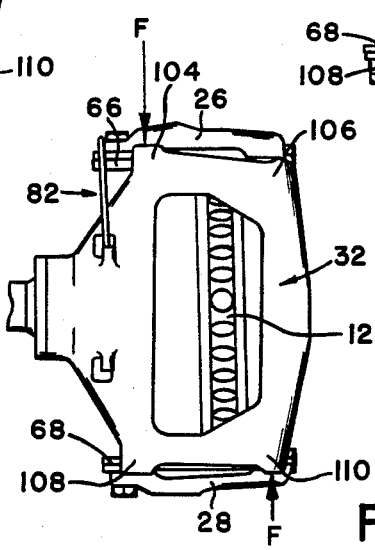
FIG. 4c

DISC BRAKE WITH CAMMING MEMBER AND TORSION SPRING FOR VIBRATION CONTROL

This invention relates to a disc brake assembly.

Many sliding caliper disc brake assemblies have been proposed before. These assemblies include a rotor mounted for rotation with a member to be braked which has a pair of friction faces, a pair of friction elements disposed adjacent the friction faces, a caliper for urging the friction elements into braking engagement with the friction faces, a support member having a pair of circumferentially spaced arms for supporting the caliper, and means for slidably mounting the caliper on the arms.

In sliding caliper disc brakes of this type, a small clearance is necessary between the caliper and the support member in order to permit the sliding motion therebetween. Vibration of the brake assembly causes this clearance to enlarge so that, if the vibration is not controlled, the assembly will eventually no longer be able to control braking torque and will fail. Prior art devices use an anti-rattle spring between the caliper and the support member in order to control vibration. However, such anti-rattle springs must be very carefully designed, because if the spring is too weak, it will not do a satisfactory job of controlling vibration, and if the spring is too strong, the resulting brake drag makes actuation of the brake difficult and results in adverse lining wear patterns because the brake does not properly release.

Most anti-rattle springs currently in use simply load the caliper against the support member. However, although springs of this type are effective to control movement of the caliper toward and away from the support member, they are ineffective in controlling pivotal movement of the caliper with respect to the torque member. Accordingly, these springs have generally been over-designed, with the resultant increase in brake drag, to mask their inefficiency in controlling pivoting of the caliper on the support member.

The present invention mounts the caliper on the support member by a rail carried by the support member which slidably supports the caliper. A torsion spring exerts a twisting force on the rail, thereby causing a camming action which provides reaction forces reacting to movement of the caliper toward and away from the arm of the support member carrying the rail in the same manner as a conventional spring loaded caliper. However, the camming action inherently resists pivoting of the caliper on the support member, because the camming action permits the reaction forces to move along the rail as necessary to resist twisting of the caliper, thereby exerting the largest possible righting moment.

The present invention has many advantages over prior art disc brake assemblies. For example, the efficiency of the torsion spring in resisting twisting of the caliper permits a lower spring load to be used, thereby resulting in a smaller spring and lower brake drag. Accordingly, larger clearances may be maintained between the caliper and support member, resulting in large machining tolerances and less chance of the caliper corroding to the support member. Furthermore, the rail or camming member acts as a sacrificial element which takes most of the wear between the caliper and support member. Accordingly, the rail can be replaced when the brake is serviced, and replacement of the rail restores the assembly to substantially its initial clearances. Finally, since the rail is a relatively small element, it can economically be made of stainless steel or other materials that are more resistant to corrosion than are materials commonly used to manufacture disc brakes.

Although a single embodiment is disclosed in the following detailed description, the scope of the invention is not limited thereby, and many variations of the disclosed concept are possible. Accordingly, the scope of the invention is to be limited only by the scope of the appended claims.

Other features and advantages of the invention will appear in the following description with reference to the accompanying drawings, in which:

FIG. 2 is an elevational view taken substantially along lines 2—2 of FIG. 1;

FIGS. 4a, 4b, 4c are diagramatic top plan views of a disc brake made pursuant to the teachings of our present invention, illustrating operation of our device.

Figure 1:
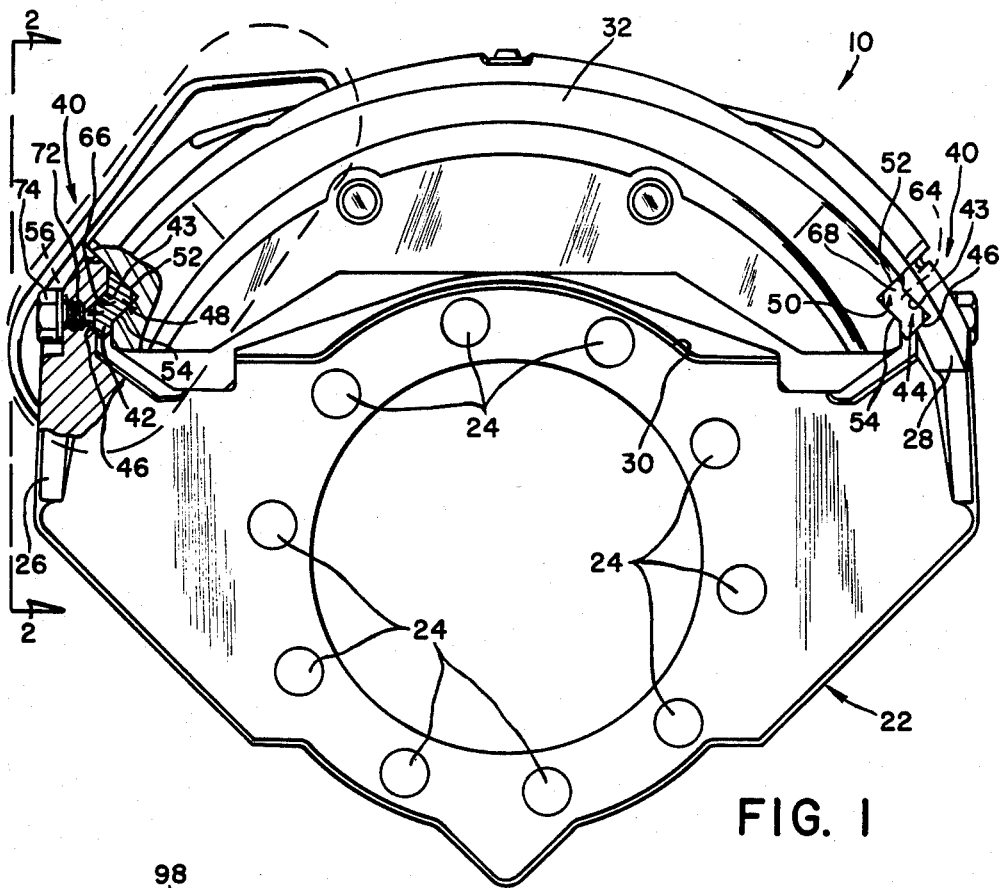
FIG. 1 is an outboard side elevational view, partly in section, of a disc brake assembly made pursuant to our present invention.
Figure 3:
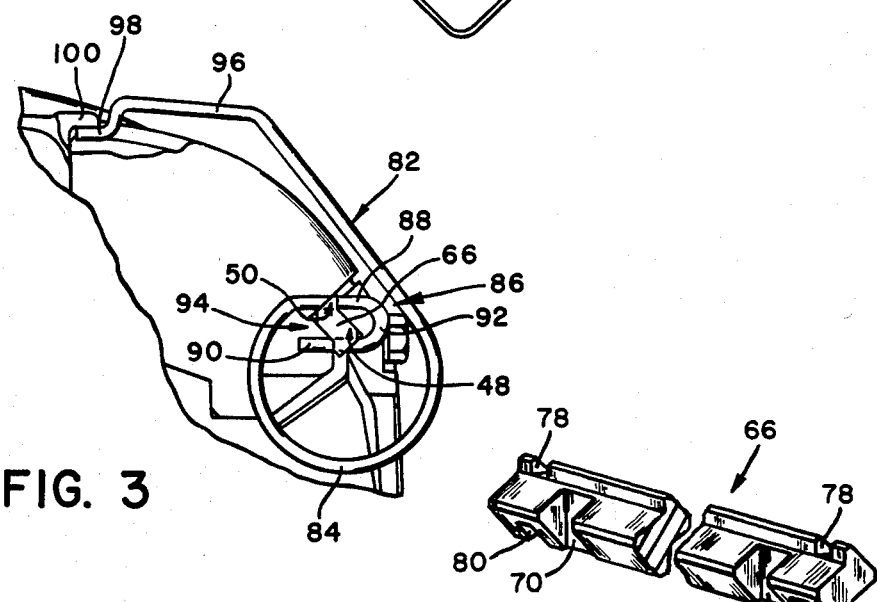
FIG. 3 is an enlarged detail view of the circumscribed portion of FIG. 1, but taken from the opposite side of the caliper from that shown in FIG. 1, to more clearly show the relationships between the various parts of the invention.

Referring now to the drawings, a disc brake generally indicated by the numeral 10 includes a rotor 12 which is mounted for rotation with a member to be braked. Rotor 12 defines a pair of opposed friction faces 14, 16 which are engaged by friction elements 18, 20 (which are mounted adjacent the friction faces 14, 16 respectively) when a brake application is effected. A support member generally indicated by the numeral 22 is installed on a non-rotative part of the vehicle by bolts (not shown) received in apertures 24 to bolt the support member 22 to the axle flange (not shown) of the vehicle. The support member 22 includes a pair of circumferentially spaced, torque-receiving arms 26, 28 which cooperate to define a recess 30 therebetween. The friction element 20 is received in the recess 30 and is supported by the support member 22 through bearing plate 23 for movement toward and away from the friction face 16 when a brake application is effected.

A caliper generally indicated by the numeral 32 includes a radially inwardly extending portion 34 which is disposed opposite the friction face 14 and supports the friction element 18 for movement toward and away from the friction face 14 in a manner well known to those skilled in the art. The caliper 32 further includes a portion 35 which straddles the periphery of the rotor 12 and which connects the inwardly extending portion 34 with an actuator housing portion 36 that extends radially inwardly opposite the friction face 16 and which houses an actuator which urges the friction element 20 into braking engagement with the friction face 16. Due to the sliding engagement between the caliper 32 and the support member 22 that will be described in detail hereinafter, braking forces are transmitted through the portion 35 to the inwardly extending portion 34 to thereby cause the latter to urge friction element 18 into braking engagement with friction face 14. The actuator installed in the actuator portion 36 in conventional disc brakes is usually a hydraulic pressure actuator, but because of the heavy duty nature of the design disclosed in this application, a mechanical actuator which transmits movement from an auxiliary air cylinder (not shown) would be appropriate. Mechanical actuators of this type are known in the prior art and, since the actuator forms no part of the present invention, it will not be described herein. The caliper 32 is slidably mounted on the arms 26 and 28 through a slidable support mechanism generally indicated by the numeral 40.

Slidable support mechanism 40 includes a pair of generally V-shaped grooves 42, 44 which are provided in the arms 26, 28 of the support member 22 and which generally face each other across the recess 30. The grooves 42, 44 are substantially identical, and both include an upper bearing surface 43 and a lower bearing surface 46. Corresponding V-shaped grooves 48, 50 are provided on opposite edges of the caliper 32 and which generally face their corresponding recess 42, 44 on the arms of the support member 22. Accordingly, the grooves 48, 50 similarly define an upper bearing surface 52 and a lower bearing surface 54. The grooves 42, 48 cooperate to define a recess generally indicated by the numeral 56 that extends through the uppermost portion 58 of the arm 26 and the corresponding section of the bridge portion 36 of the caliper 32. The recess 56 extends substantially parallel to the axis of rotation of the rotor 12 from the inboard end 60 of the portion 58 to the outboard end 62 thereof. A similar recess 64 is defined by the grooves 44, 50.

Figure 5:
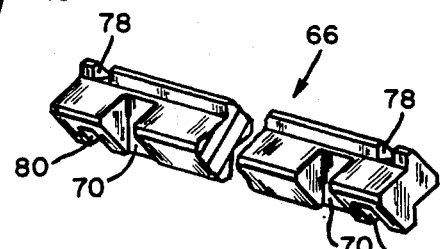
FIG. 5 is a perspective view of the rail used in the disc brake of our invention.

A pair of elongated rails 66, 68 are received in the recesses 56, 64 respectively. As will be seen, the rails 66, 68 act as bearings supporting the weight of the caliper 32 and also receive all of the braking torque transmitted from the caliper 32 to the support member 22 when a brake application is effected. Accordingly, the rails 66, 68 are preferably made of stainless steel or a similar strong, non-corrosive material so that the sliding engagement of the caliper with the rails will not be impeded by corrosion. Since the rails 66, 68 are substantially identical, only the rail 66 will be described in detail. As illustrated most clearly in FIG. 5, the rail 66 is provided with a recess 70 which receives the projecting portion 72 of a bolt 74 which is screwed in an aperture provided in the uppermost portion 58 of the arm 26. The projecting portion 72 is adapted to engage the walls of the recess 70 to thereby prevent the rail 66 from being knocked out or falling out of the recess 56, but does not restrain rotation of the rail 66 about its longitudinal axis.

One end 76 of the rail 66 extends beyond the end 64 of the uppermost portion 58 of support arm 26 and is provided with a pair of substantially parallel, transversely opposed recesses or grooves 78, 80. A torsion spring generally indicated by the numeral 82 includes a loop of spring wire 84, one end of which terminates in a hook 86 comprising spaced parallel side portions 88, 90 and a connecting elbow 92. The side portions 88, 90 cooperate to define an elongated aperture 94 which has a width greater than that of the rail 66, so that the torsion spring 82 can be installed on the rail 66 by first slipping the aperture 94 over the end of the rail, and then rotating the spring approximately 45° to engage the spaced parallel side portions 88, 90 thereof with the corresponding parallel recesses 78, 80 in the end 74 of the rail 66. The other end of the loop 84 terminates in an elongated arm 96 which in turn terminates in a hooked portion 98. The hooked portion 98 is adapted to engage a detent 100 defined by an aperture in the caliper 32.

The torsion spring 82 is designed such that engagement of the arm 96 with the detent 100 in the caliper 32 stresses the loop 84 by winding it about the elbow 92. The loop 84, accordingly, attempts to unwind, thereby transferring the stress in the loop 84 through the hook 86 to the rail 66. Accordingly, the loop 84 yieldably urges the rail 66 in a counter-clockwise direction, thereby camming the edges of the rail 66 against the corresponding edges of the grooves 42 and 50.

Referring now to FIGS. 4a, 4b, and 4c, the caliper 32 and support member 22 are illustrated in all these drawings in the positions which they would be installed on the vehicle. The caliper 32 is installed substantially vertically, so that the rail 68 bears all of the weight of the caliper, and may also absorb braking torque during a brake actuation, depending upon the direction of rotation of the rotor 12, as is well understood by those skilled in the art. Referring to FIG. 4a, the spring 82 and rail 66 control vertical movement of the caliper in much the same way as do existing prior art anti-rattle springs. The stress in the spring 82 is transmitted to the rail 66, and because of the camming action of the rail, the force resolves into restoring forces "$\frac{1}{2}$ F" that are applied at the two points of contact between the caliper 32 and the arm 26 and likewise between the caliper 32 and the arm 28. In this particular caliper design, the caliper engages the rails 66 at axially spaced bearing surfaces 104, 106 and engages the rail 68 at axially spaced bearing surfaces 108 and 110. Because of the camming action of the rail, the reaction loads F can be immediately transferred to any point along the rail since the rail is not itself resilient, but only acts to transfer the torsional force supplied by the spring 82. Accordingly, if the caliper tends to pivot in the counter-clockwise direction, thereby forcing the bearing surfaces 106 and 108 more tightly against their corresponding rails and leaving a slight gap between the bearing surfaces 104 and 110 in their corresponding rails, the reaction forces result into the forces F and are applied as illustrated in FIG. 4b. Similarly, as shown in FIG. 4c, if the caliper 32 pivots in the clockwise direction, the rail 66 transfers the force of the torsion spring 82 to the opposite bearing surfaces. Accordingly, since the rail 66 acts only as a transfer device to transfer the force exerted by the spring 82, the spring 82 is applied wherever necessary to overcome the vibration forces of the caliper.

We claim:

1. Disc brake assembly comprising a rotor mounted for rotation with a member to be braked, said rotor having a pair of friction faces, a pair of friction elements disposed adjacent said friction faces, a caliper for urging said friction elements into braking engagement with said friction faces, a support member for said caliper, and means for slidably mounting said caliper on said support member, said slidably mounting means including a camming member carried by said support member and slidably engaged by said caliper, and means for yieldably rotating said camming member, said rotating means including a torsion spring engaging said camming member and yieldably biasing the latter in a predetermined rotative direction, said torsion spring including a loop, one end of said loop terminating in a first connecting portion for securing said loop to said camming member, the other end of said loop terminating in a second connecting portion engaging said caliper to thereby stress said loop to cause the latter to provide a yieldable rotating force through said first connecting portion to said camming member.

2. Disc brake assembly comprising a rotor mounted for rotation with a member to be braked, said rotor having a pair of friction faces, a pair of friction elements disposed adjacent said friction faces, a caliper for urging said friction elements into braking engagement with said friction faces, a support member for said caliper, and means for slidably mounting said caliper on said support member, said slidably mounting means including a camming member carried by said support member and slidably engaged by said caliper, and means for yieldably rotating said camming member, said rotating means including a torsion spring engaging said camming member and yieldably biasing the latter in a predetermined rotative direction, said torsion spring terminating in a hook defining spaced parallel side portions, said camming member having a pair of recesses, each of said recesses receiving a corresponding one of said side portions.

3. Disc brake assembly comprising a rotor mounted for rotation with a member to be braked, said rotor having a pair of friction faces, a pair of friction elements disposed adjacent said friction faces, a caliper for urging said friction elements into braking engagement with said friction faces, a support member for said caliper, and means for slidably mounting said caliper on said support member, said slidably mounting means including a camming member carried by said support member and slidably engaged by said caliper, and means for yieldably rotating said camming member, said rotating means including a torsion spring engaging said camming member and yieldably biasing the latter in a predetermined rotative direction, said camming member being an elongated rail carried by said support in a groove defined within said support member, said rail including a projecting portion projecting from said groove, said torsion spring having a first connecting portion for connecting said torsion spring with said projecting portion of the rail and a second connecting portion connecting said torsion spring with said caliper to thereby stress said torsion spring to cause the latter to provide a yieldable rotating force through said first connection portion to said camming member.

4. Disc brake assembly comprising a rotor mounted for rotation with a member to be braked, said rotor having a pair of friction faces, a pair of friction elements disposed adjacent said friction faces, a caliper for urging said friction elements into braking engagement with said friction faces, a support member for said caliper, said support member having a pair of circumferentially spaced arms, and means for slidably mounting said caliper on said arms, said slidably mounting means including a camming member supported on one of said arms and slidably engaged by said caliper, and means yieldably rotating said camming member, said camming member being an elongated rail carried by said one arm of said support member and extending substantially parallel to the axis of rotation of said rotor, said rail including a projecting portion projecting from said support member, said yieldably rotating means engaging said projecting portion of the said rail.

5. Disc brake assembly as claimed in claim 4, wherein said yieldably rotating means is a torsion spring engaged with said rail.

6. Disc brake assembly as claimed in claim 5, wherein said torsion spring has an end terminating in a hook having parallel side portions, said projecting portion of said rail having a pair of recesses, each of said recesses receiving a corresponding one of said side portions when the torsion spring is installed on said brake assembly.

7. Disc brake assembly as claimed in claim 6, wherein one of said side portions of said hook extends into a loop to provide a yieldable rotating force to said rail through said hook, said loop terminating in a connecting portion engaging said caliper to thereby stress said loop to cause the latter to provide said yieldable rotating force.

8. Disc brake assembly as claimed in claim 7, and means for releasably retaining said rail in said groove, said releasable retaining means permitting limited rotation of the rail within the groove, but restraining axial movement of the rail with respect to said support member without release of the releasable retaining means.

9. Disc brake assembly comprising a rotor mounted for rotation with a member to be braked, said rotor having a pair of friction faces, a pair of friction elements disposed adjacent said friction faces, a caliper for urging said friction elements into braking engagement with said friction faces, a support member for said caliper, said support member having a pair of circumferentially spaced arms, and means for slidably mounting said caliper on said arms, said slidably mounting means including a camming member supported on one of said arms and slidably engaged by said caliper, and means yieldably rotating said camming member, said caliper and said one arm of said support member having elongated grooves extending substantially parallel to the axis of rotation of said rotor, the groove on said caliper cooperating with the groove on said support member to define an elongated recess, said camming means being a rail mounted in said recess and having a projecting portion projecting from said recess, said yieldably rotating means engaging said projecting portion of said rail to rotate the edges of the latter into camming engagement with corresponding edges of the grooves.

10. Camming member for connecting the caliper and support member of a disc brake assembly, said camming member being an elongated rail carried by a rail support member, said rail having transversely extending spaced recesses for receiving the connecting portion of a torsion spring for yieldably rotating the camming member relative to said disc brake assembly, said rail being provided with a groove for receiving a retaining member carried by said support member for retaining said camming member thereon, and said recesses are substantially parallel and are located adjacent one end of said rail.

* * * * *